Jan. 14, 1930.  K. PFEIFFER  1,743,619
METHOD OF TESTING SPRINGS
Filed Dec. 19, 1927
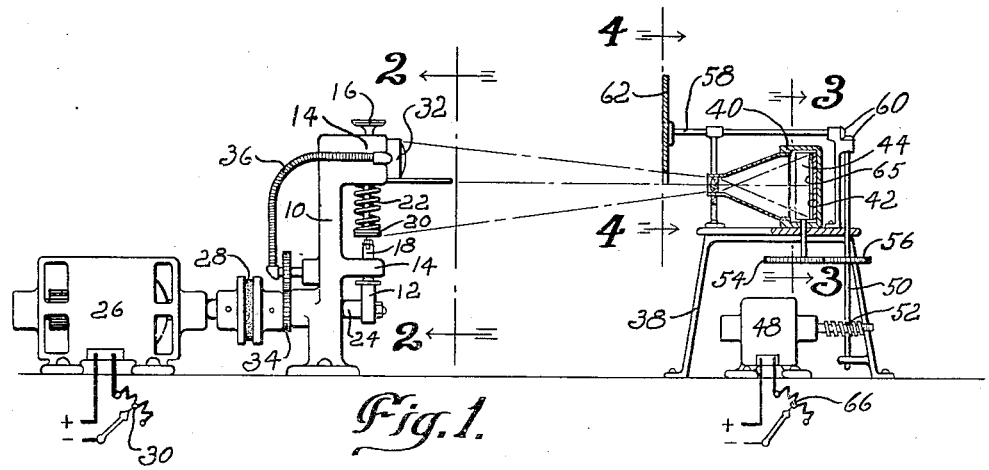
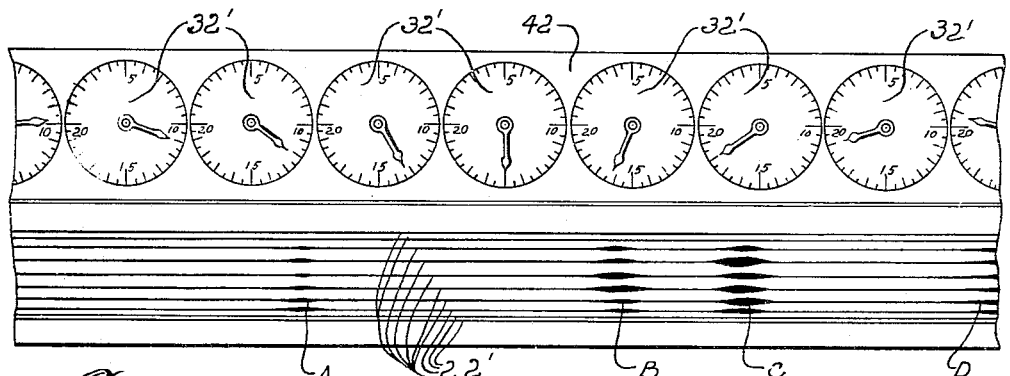
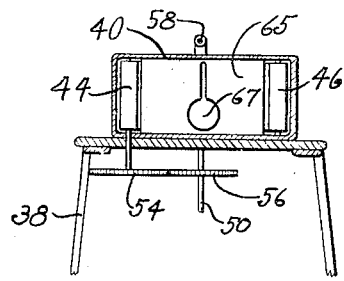
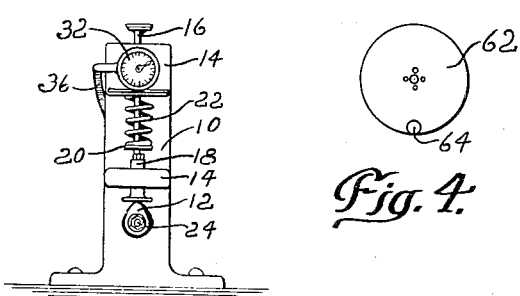
INVENTOR
KARL PFEIFFER.
BY
ATTORNEY Patented Jan. 14, 1930

1,743,619

UNITED STATES PATENT OFFICE

KARL PFEIFFER, OF DETROIT, MICHIGAN, ASSIGNOR TO CHRYSLER CORPORATION, OF DETROIT, MICHIGAN, A CORPORATION OF DELAWARE

METHOD OF TESTING SPRINGS

Application filed December 19, 1927. Serial No. 240,964.

This invention relates to a method for testing coil springs and is illustrated as embodied in a device for testing valve springs commonly used in internal combustion engines.

When a force acts on a spring, such as a result of the action of the valve mechanism on a valve spring, it tends to set up in the spring a wave motion, the wave length of which is dependent upon the natural frequency of the spring. If the wave length of the forced vibration is of such magnitude that an integral number of the free wavelengths will be completed, the applications of force will be in phase and the resulting wave motion in the spring will be resonant.

As the spring is vibrating in its own period, certain coils may be compressed solid, while others may be opened up beyond their normal position. This causes the valve springs to break.

It is an important object of this invention to provide a means for determining the action of a spring during its operation and to properly locate the natural vibration periods of the spring with respect to the speed of the forced vibration.

Another object of the invention is to record the spring action, as for example by the photographic process.

Other objects and advantages will more fully appear from the following description taken in connection with the accompanying drawings, in which:

Fig. 1 is a side elevation of my improved apparatus, parts being shown in section.

Fig. 2 is a view, taken on line 2—2 of Fig. 1, showing in elevation, the spring operating mechanism.

Fig. 3 is a sectional view on line 3—3 of Fig. 1.

Fig. 4 is a view of the shutter plate as viewed in the direction of the arrows on line 4—4 of Fig. 1.

Fig. 5 is a view illustrating an exposed film.

Referring to the drawings I have shown a frame structure 10 adapted to support a cam 12 and extensions 14 on the frame 10 form guides for a valve 16 and valve tappet 18 mounted over the cam 12 to be reciprocated by the latter. The lower end of the valve stem is provided with an abutment 20 and a valve spring 22 is held under compression between the abutment 20 and the lower surface of the upper extension 14. The cam is secured to a shaft 24, journaled in the frame 10 and is driven by a motor 26 through a coupling 28. A rheostat 30 has been illustrated as a means for varying the speed of the motor 26 and cam 12. A speed indicator 32 has been shown mounted on the upper extension 14 and is driven by the shaft 24 through gears 34 and flexible coupling 36.

It will be understood that by the above construction a force may be applied to the valve spring, reproducing the action of the valve mechanism and its spring in an internal combustion engine. The speed indicator designates the revolutions per minute of either the crankshaft or the camshaft.

In front of the mechanism for reproducing the normal action of the spring I have shown a support 38 upon which is mounted a camera 40 in such position to photograph the spring and the speed indicator. The camera 40 is shown of the type adapted to receive a roll film 42 which is adapted to roll on spools 44 and 46. An electric motor 48 has been provided which drives a vertically arranged shaft 50 through gearing 52. The spool 44 is driven by a gear 54 meshing with a gear 56 on the shaft 50. A horizontal shaft 58 is driven by the shaft 50, through gears 60, and is adapted to rotate a shutter plate 62, a portion of which is in front of the camera. Adjacent the periphery of the shutter plate 62 is an opening 64 which intermittently exposes the speed indicator 32 on a portion of the film 42. The shutter plate 62 has been so positioned that its lower edge covers the upper half of the camera lens. A plate 65, provided with a "keyhole" slot 67 is adapted to cover the film to prevent too great an exposure on the film and to confine the exposure solely to the nearest portion of the spring coils. It will be understood that the slot permits only an exposure of the indicator and a narrow portion of the spring throughout its length. As each coil of the spring is diagonally positioned the narrow slot permits only a small portion of each coil to be exposed on the film, thereby producing a narrow line on the film.

A rheostat 66 is shown for obtaining a variable speed of the shutter and the spool which winds the film across the back of the camera. It will be understood that the shutter rotating at a speed in proportion to the movement of the film, intermittent exposures will be made of the speed indicator on one half of the film and as the film is continuously moving across the back of the camera a series of straight lines will be produced on the other half of the film, caused by the high light on each coil of the spring.

Referring to Fig. 5, I have illustrated an exposed film made in accordance with my invention. The different speeds have been recorded as at 32' and the straight lines are shown as at 22'. The natural vibration periods of the springs are shown as at A, B, C and D, the lines 22' becoming blurred and widened due to the vibration of the spring.

By the above method a permanent record has been made of the spring action at its various speeds and by taking the speed reading adjacent the vibration periods every vibration period may be determined. In the form illustrated, the vibration period A occurred at 1200 R. P. M., period B at 1600 R. P. M., period C at 1800 R. P. M., and period D at 2000 R. P. M.

It will be understood that various changes in the construction illustrated may be made without departing from the spirit or method of my invention and it is not my intention to limit its scope other than by the terms of the appended claims.

What I claim is:

1. The method of testing a coil spring which consists in intermittently compressing the spring to be tested, and photographing the spring on a continuously moving film.

2. The method of testing a coil spring which consists in intermittently compressing the spring to be tested, varying the speed of the intermittent compression of said spring, and photographing the spring on a continuously moving film.

3. The method of testing a coil spring which consists in intermittently compressing the spring to be tested, varying the speed of the intermittent compression of said spring, indicating the speed of the intermittent compression, and photographing the spring and indicator on a continuously moving film.

4. The method of testing a coil spring which consists in reproducing the normal action of the spring to be tested, and photographing a narrow portion of said spring throughout its length on a continuously moving film.

5. The method of testing a coil spring which consists in intermittently compressing the spring to be tested, varying the speed of the intermittent compression of said spring, indicating the speed of the intermittent compression, and photographing the spring and indicator on a single continuously moving film, said indicator being exposed to said film intermittently.

6. The method of testing a coil spring which consists in intermittently compressing the spring to be tested, varying the speed of the intermittent compression of said spring, indicating the speed of the intermittent compression, and photographing a narrow portion of said spring throughout its length and the indicator on a single movable film.

7. The method of testing a coil spring which consists in intermittently compressing the spring to be tested, and photographing a narrow portion of said spring throughout its length on a movable film.

KARL PFEIFFER.